April 24, 1951     W. L. HUNTINGTON     2,549,815
SERVO UNIT

Filed Feb. 18, 1946     5 Sheets-Sheet 1

INVENTOR.
WILLIAM L. HUNTINGTON.
BY George N. Fisher
ATTORNEY

April 24, 1951 W. L. HUNTINGTON 2,549,815
SERVO UNIT
Filed Feb. 18, 1946 5 Sheets-Sheet 2

INVENTOR.
WILLIAM L. HUNTINGTON
BY
George H. Fisher
ATTORNEY

April 24, 1951     W. L. HUNTINGTON     2,549,815
SERVO UNIT

Filed Feb. 18, 1946     5 Sheets-Sheet 3

INVENTOR.
WILLIAM L HUNTINGTON
BY
George H. Fisher
ATTORNEY

INVENTOR.
WILLIAM L. HUNTINGTON
BY
George H. Fisher
ATTORNEY

April 24, 1951  W. L. HUNTINGTON  2,549,815
SERVO UNIT
Filed Feb. 18, 1946  5 Sheets-Sheet 5
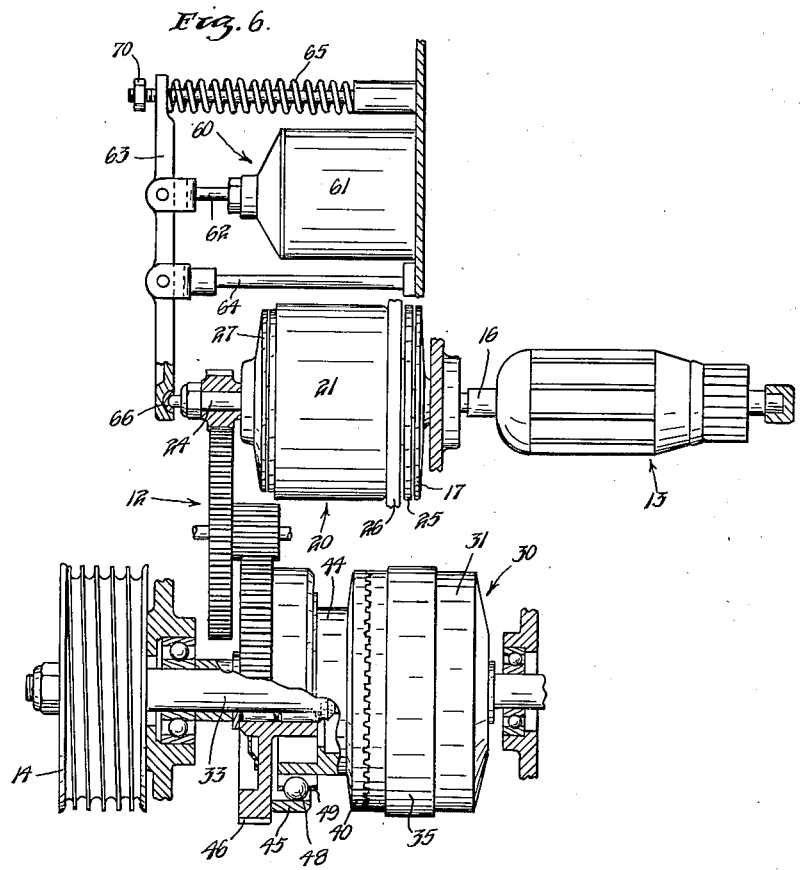
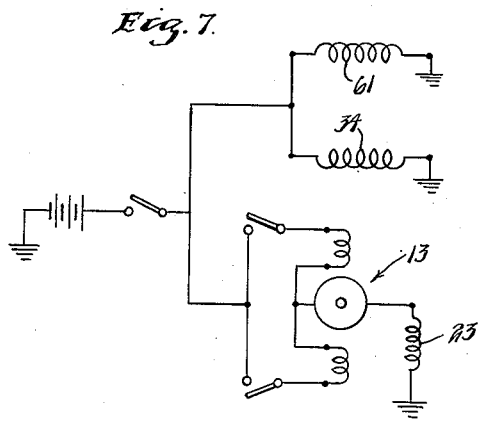
INVENTOR.
WILLIAM L. HUNTINGTON
BY
George H. Fisher
ATTORNEY Patented Apr. 24, 1951

2,549,815

UNITED STATES PATENT OFFICE 2,549,815

SERVO UNIT

William L. Huntington, Minneapolis, Minn., assignor to Minneapolis-Honeywell Regulator Company, Minneapolis, Minn., a corporation of Delaware Application February 18, 1946, Serial No. 648,484

15 Claims. (Cl. 74—625)

This invention relates to improvements in servo unit construction and more specially to the type of servo unit employed in the control of aircraft. However, it will be apparent that employment of the improved device of this invention is not necessarily limited to the precise embodiment disclosed or to this one particular field.

In present day aircraft navigation provision is made for operating the controls by various electromechanical, hereinafter referred to as automatic, devices as well as by manually operated devices. It is highly desirous that the transition from one type of control to the other, as from automatic to manual, be accomplished speedily and with certainty in order to avoid hazard, damage and possibly destruction of the craft, load and operator.

In the use of automatic controls on aircraft, various types of servomotor units are employed in different arrangements to furnish motive power for operating the controls. In these arrangements, it is customary to provide some kind of clutching and braking means closely adjacent the motor, or high speed end of the arrangement. Thus, both clutch and brake have a considerable mechanical advantage over the resistance and pressure offered by the operated control member. In the present combination automatic-manual control systems it is conventional practice to attach the manually actuated controls to the automatically actuated controls. Accordingly manual operation entails operative movement of at least a portion of the automatically operated system. It is also customary to provide a clutch mechanism on the output shaft, or near the low speed end of the unit so that in manual operation it will not be necessary to rotate the entire gear train and driving mechanism.

Aircraft controls are in normal use often subjected to severe stresses and strains caused by air pressure against a rudder, elevator or other operated part especially at high speeds. The clutch mechanism on the output shaft, or near the low speed end of the unit, is thus subjected to the severe strains and stresses of the system without the benefit of the cushioning or shock absorbing action of the reducing gears. Consequently, the output shaft clutch, which usually includes a splined driving connection, requires considerable attention in the nature of periodic inspections and frequent replacements. The slidably engaging surfaces of the splined driving connection tend to gall and score under the resistance to control movement. The galling or scoring of any of the slidably engageable surfaces of the splined clutch increases the friction between the galled and other surfaces and thereby tends to stick or freeze the parts together. Obviously then, if the clutch is in engaged position at the time of such freezing it cannot be disengaged. The converse of this is also true.

In view of the fact that it is necessary, in conventional constructions, to release the output shaft clutch prior to changing from automatic to manual control, it will be apparent that such a transition cannot be made under frozen clutch conditions. Under such conditions, the pilot has no choice in the selection or use of manual or automatic controls. If, for any reason, the automatic control is inoperable and the clutch is frozen in engaged position then the pilot has no control of any kind over the aircraft.

It is therefore one of the chief objects of the present invention to provide means for reducing the probability of malfunction of the improved servo unit of this invention and to provide efficient and positive acting safety means which enables a pilot to change from automatic to manually operated control regardless of the condition or the position of the output shaft clutch. Furthermore, the transition may be made speedily and with certainty.

Still another object of advantage and importance is the provision of means utilizing antifriction means between opposed driving surfaces of the free member of the output shaft clutch. The antifriction means being arranged to provide a positive driving connection between the associated parts, and to facilitate operable movement to thereby reduce or totally eliminate the tendency of sticking or freezing of the operable parts.

Another object of advantage and importance resides in the provision of means for automatically setting a brake to maintain the final driven member stationary when the motor is deenergized and of means for releasing the brake substantially concurrently with the deenergization of the output shaft clutch so that the final driven member may be operated manually.

An additional object of advantage and importance resides in the provision of means for incorporating two independently functioning release means between the driving motor and the final driven member of the improved device of this invention. One release means being an electromagnetic clutch mounted on the final output shaft and being selectively operable to release that portion of the device from the driving or braking portion thereof whereupon the final driven member may be operated manually. The other release means is preferably associated with an intermediate shaft and being operable concurrently with the deenergization of the clutch to release the securing brake whereupon the final driven member may be manually operated when the output shaft release means or clutch fails to function properly and does not release upon deenergization.

Additional objects of advantage and importance will become apparent as the following detailed description progresses, reference being had to the accompanying drawings; wherein, Figure 1 is a front elevational view of a servo unit which embodies the invention;

Figure 6 is a schematic arrangement of the operating parts of the improved unit; and, Figure 7 is a diagram of a simplified electrical circuit arrangement which may be employed with the unit.

Figure 1:
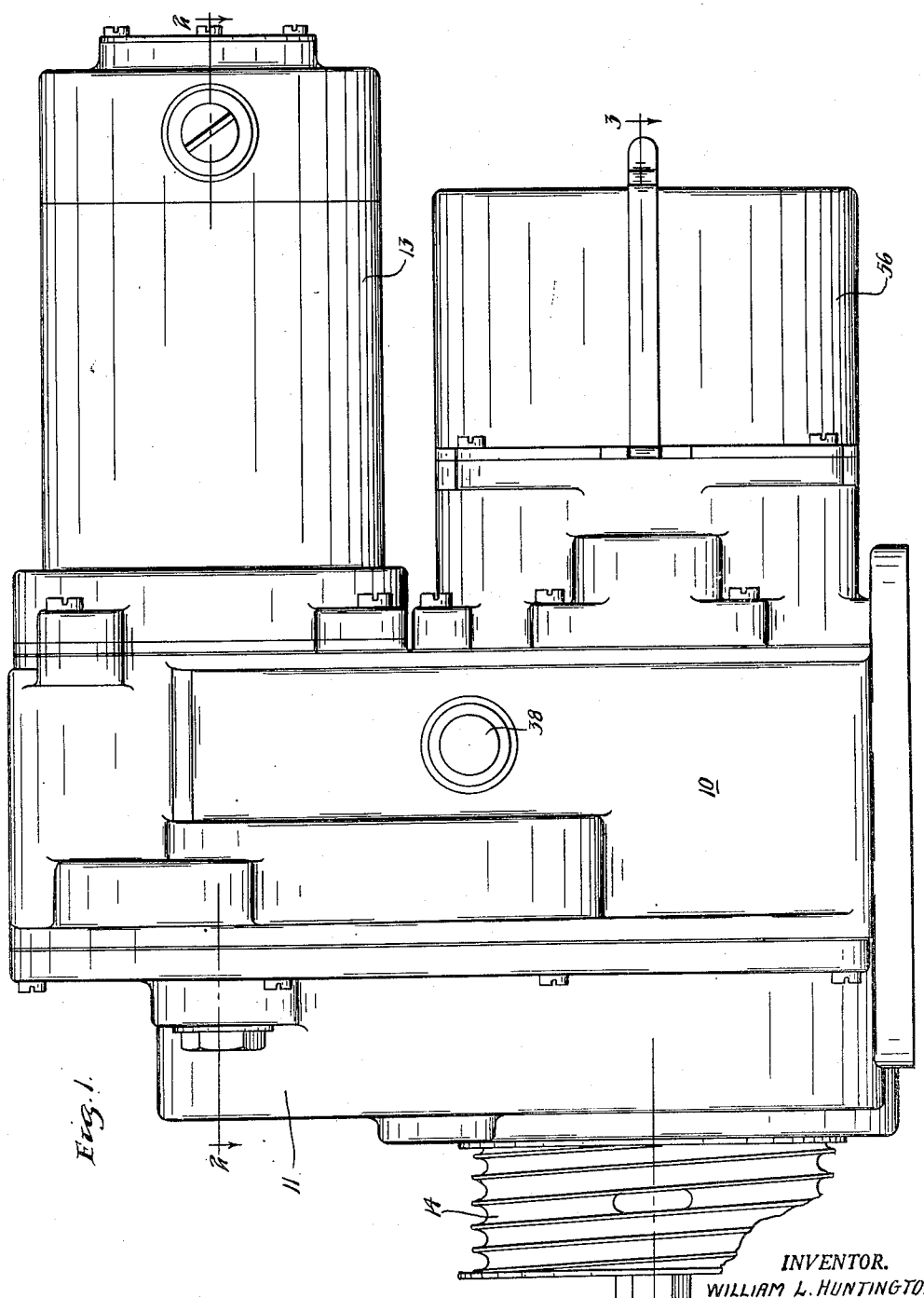

The reference numeral 10 indicates generally a housing which is provided with an end plate 11 and thereby is adapted to encase the working parts of the improved servo units of this invention. The housing 10 and end plate 11 may be constructed of any suitable material and may be varied in shape as desired from the structure illustrated.

Positioned within the housing 10 is a reduction gear train 12 which has a reversible electric motor 13 operably attached to one end thereof and a driven member in the form of a grooved sheave or cable drum 14 at the other. The gear train 12 preferably includes a torque adjustment member 15 which functions in a well-known manner to prevent undue strain on and breakage of the operating parts of the unit. The reversible electric motor 13 is provided with a drive shaft 16 at one end of which a circular drive disk 17 is fixed. The disk 17 and shaft 16 thus are adapted to rotate in unison, but are secured by bearings 18 against axial movement.

Figure 2:
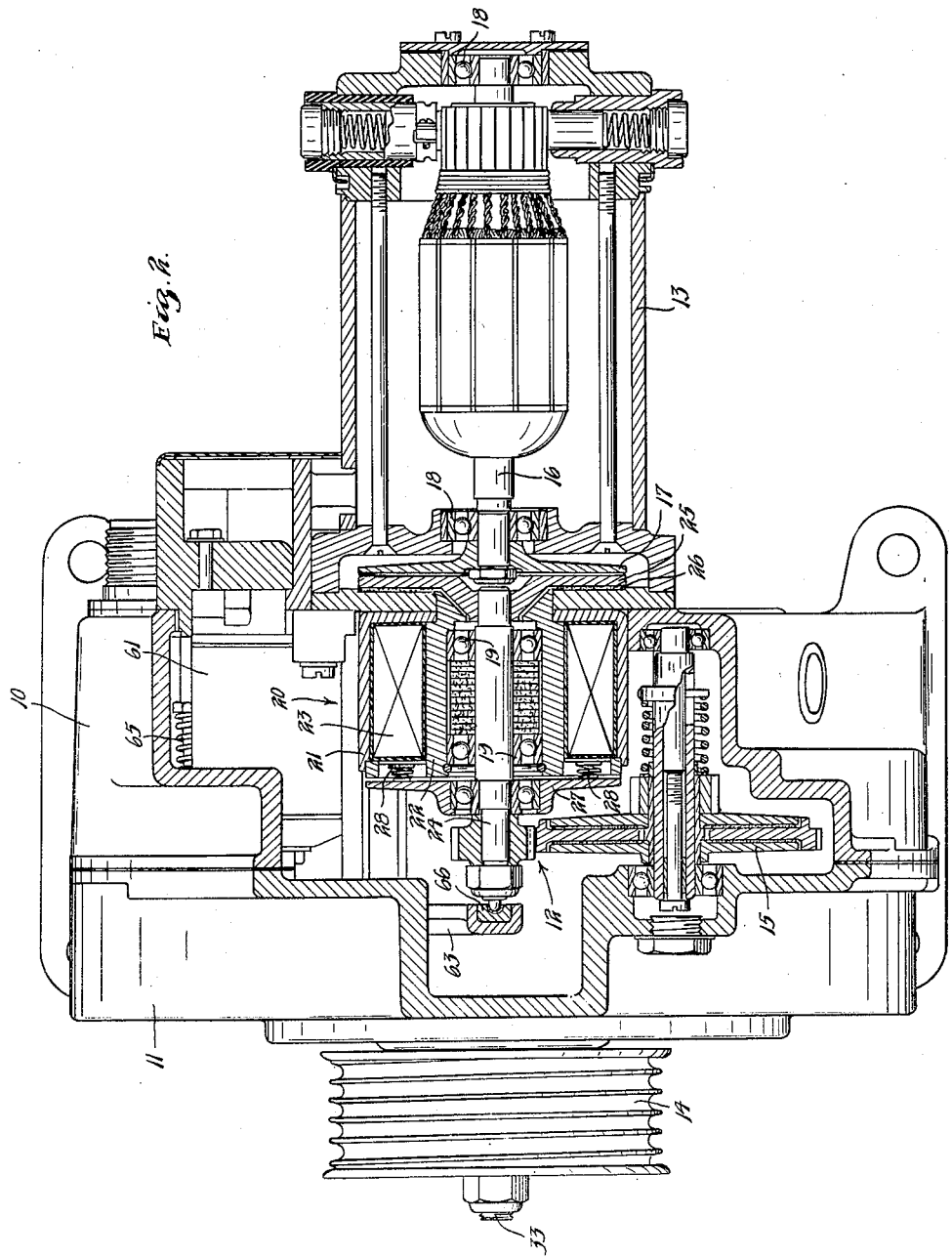
Figure 2 is a horizontal section thereof taken on line 2—2 of Figure 1 looking in the direction indicated by the arrows.

Positioned intermediate the high speed end of the reduction gear train 12 and the motor 13 is a magnetic type combination clutch and brake member indicated by the reference numeral 20. The combination member 20 includes a cup-shaped case 21 in which a hollow core 22 is positioned. An actuating winding 23 is inserted in the space between the peripheral surface of the core 22 and the inner surface of the cup-shaped case 21 as is best shown in Figure 2. A shaft 24 rotationally and slidably journaled on bearings 19 within the core 22 extends therebeyond and is coaxially aligned with the motor drive shaft 16. Rigidly fixed to one end of the shaft 24 in any suitable manner, such as by splining (not shown), is a disk 25. One surface of the disk 25 is adapted to be moved into engagement with the surface of disk 17 to provide a friction driving connection between the motor shaft 16 and the clutch shaft 24, and the other surface of the disk 25 may be moved into engagement with a stationary friction member 26 to provide a brake for arresting the rotational movement of disk 25 and shaft 24.

Fixed to the other end of the shaft 24 is a pinion which forms a part of the reduction gear train 12. Journaled to the shaft 24 at the open end of the cup-shaped case 21 and secured against axial movement relative to the shaft is an armature 27. Mounting armature 27 on shaft 24 is a ball bearing adapted to take thrust in either direction, such as is shown in Figure 2, the inner and outer races of which are secured to shaft 24 and armature 27, respectively. The pinion of gear train 12 secures the inner race of this bearing to shaft 24 since it presses the inner race of the bearing against a shoulder in shaft 24 and is secured itself by the nut on the end of said shaft. A plurality of compression springs 28 interposed between the winding 23 and the armature 27 function to urge the armature 27 from engagement with the cup-shaped case 21 and the core 22. The armature 27 and disk 25 are spaced on the shaft 24 to permit limited axial movement thereof so that the movement is terminated in one direction by engagement of disk 25 with disk 17 and in the opposite direction by engagement of disk 25 with friction member 26.

Figure 3:
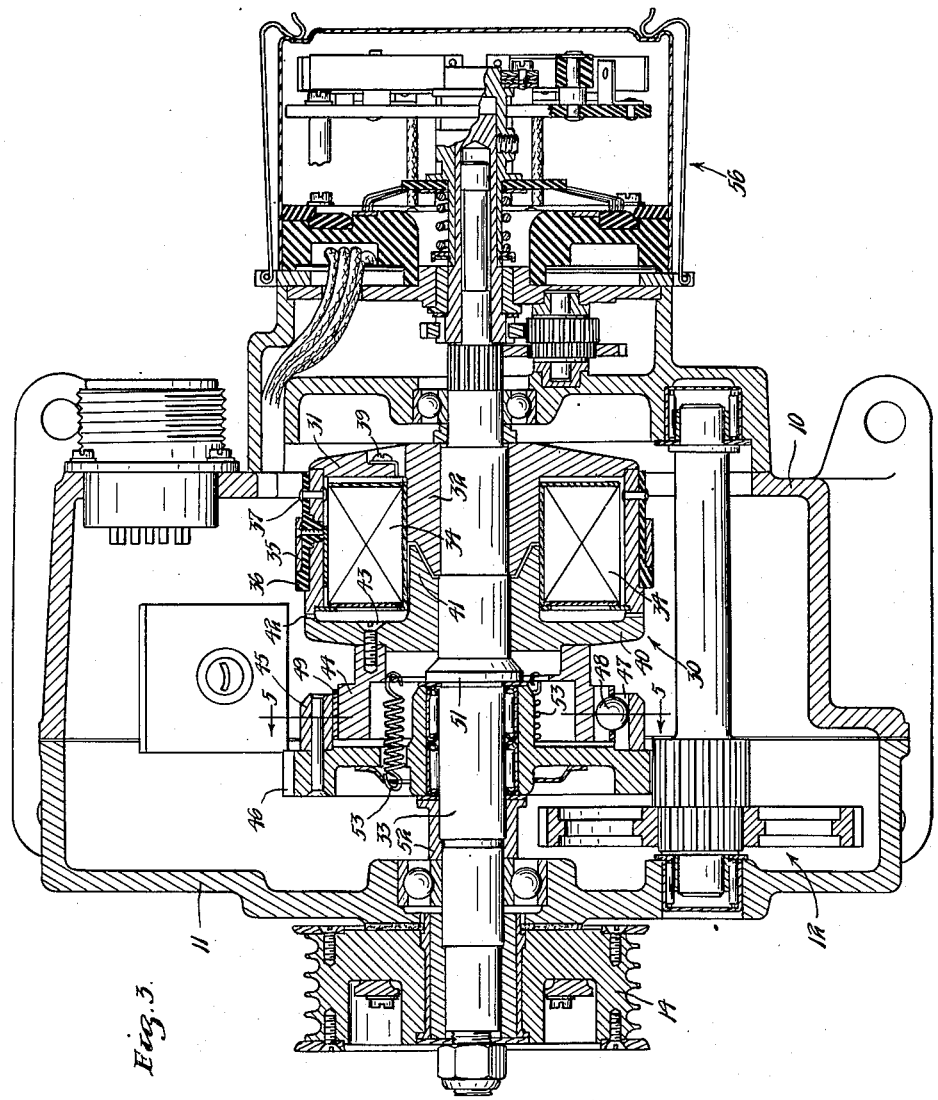
Figure 3 is a horizontal section of the device taken on line 3—3 of Figure 1, looking in the direction indicated by the arrows.
Figure 4:
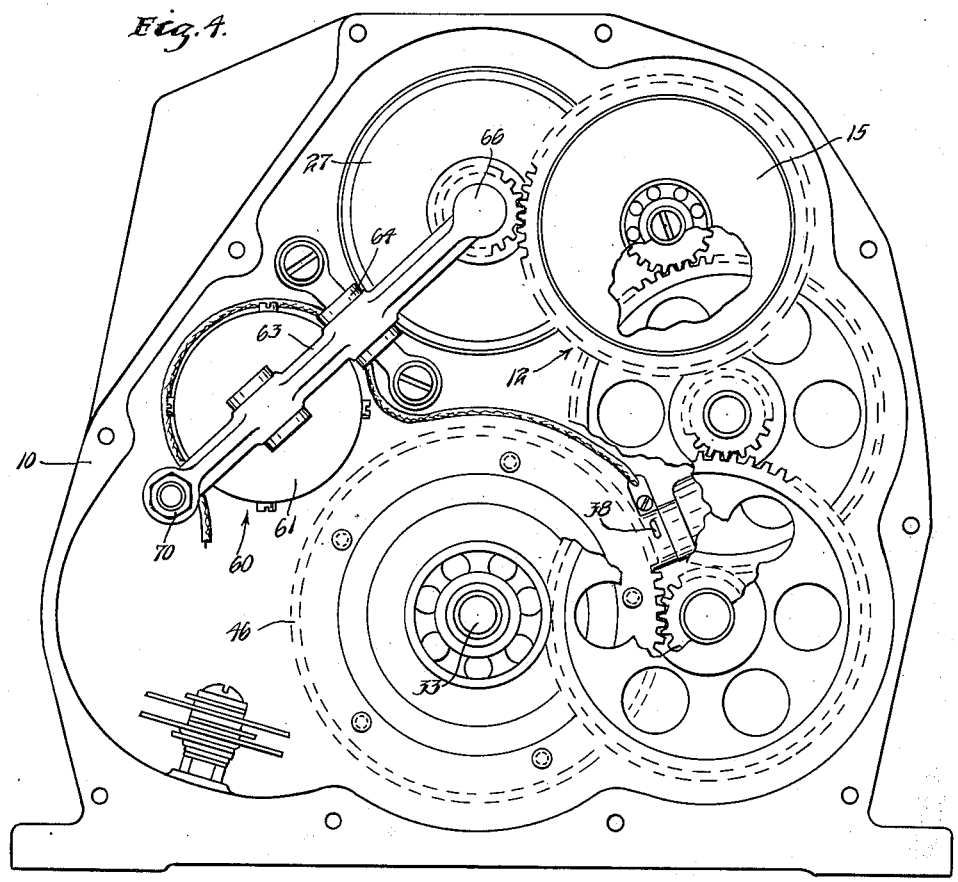
Figure 4 is an end elevation of the unit with the end plate thereof removed to show the underlying structure.

Operably positioned at the output end of the reduction gear train 12 is an electromagnetically operated clutch indicated in its entirety by the reference numeral 30 (see Fig. 3). The clutch 30 includes a cup-shaped member 31 having a cored center portion 32 secured as by splining to output shaft 33. A ring-shaped winding 34 positioned within the cup-shaped member 31 is electrically connected to a conductor band 35. The conductor band 35 is electrically insulated from the cup-shaped member 31 by a suitable non-conducting member 36 which may be secured in position by rivets 37 or the like. Suitable means such as a carbon brush 38 may be employed for connecting the rotatable conductor band 35 with a source of electric energy (see Fig. 4). The winding 34 may be grounded to the cup-shaped member 31, as by a screw 39.

Figure 5:
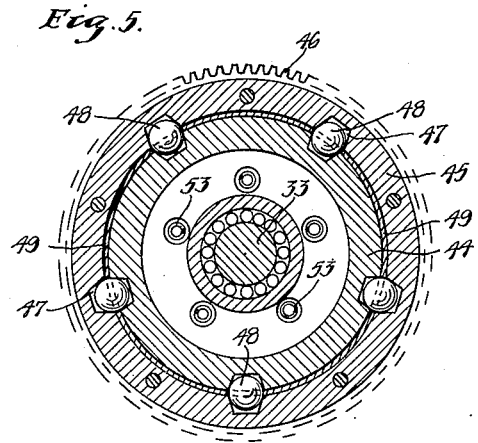
Figure 5 is a vertical section of a portion of the device taken on line 5—5 of Figure 3.

Positioned on the output shaft 33 and freely movable both rotationally and axially is an armature member 40. The armature 40 has a cored central portion 41 which is adapted to be telescoped within the ring-shaped winding 34 as is best shown in Figure 3. The open end of the cup-shaped member 31 and a corresponding portion of the armature member 40 are provided with cooperating teeth 42 or kerfs which upon movement into meshed position drivingly connect the two members together. Suitably attached to the armature member 40, as by screws, is an annular connecting member 44. The annular member 44 is telescoped into a cooperating ring 45 secured to the final gear 46 of the reduction gear train 12. The inner peripheral surface of ring 45 and the outer peripheral surface of the annular connecting member 44 are each provided with a like plurality of axially extending flutes 47 as is best shown in Figures 3 and 5. Positioned within the aligned flutes 47 and drivingly connecting the ring 45 and the annular member 44 are suitable ball members 48. The balls 48 in addition to drivingly connecting the two ring-shaped members also provide an antifriction bearing to facilitate the axial movement of the annular member 44. An annular cage 49 positioned between the opposed peripheral surfaces of the ring-shaped members 44 and 45 functions to maintain the balls 47 in operating position. It is to be noted that the final gear 46 is journaled on the shaft 33 for free rotation, but is prevented from axial movement thereon by a shoulder 51 at one end of its hub portion and a spacer member 52 at the other end thereof. A plurality of relatively strong biasing springs 53 urge the armature 40 away from the teeth or kerfed surface 42 of the cup-shaped member 31 when coil 34 is deenergized. Thus in the deenergized condition of coil 34 only the cup-shaped member 31 of clutch 30 because it is rigidly fixed to the output shaft 33 is normally capable of being moved by movement of said shaft. The gear 46, ring 45, annular member 44 and the armature are all loosely positioned or journaled on shaft 33 and are free to rotate as a unit independent of the shaft when clutch 30 is deenergized, that is, when the driving connection between the gear train 12 and the shaft 33 is not made at the clutching surface or teeth 42 of clutch 30. It is evident then that the operation of clutch 30 is to disconnect the output shaft from the gear train and the motor actuator.

In the preferred embodiment of the improved servo unit of this invention the grooved sheave 14 is keyed or otherwise secured to the output shaft 33. An operating cable, not shown, may be suitably attached to the sheave 14 and be extended to a controlling member, such as rudder or the like, of the craft with which the unit is associated. Positioned on the opposite end of the shaft 33 is a balance potentiometer control arrangement 56 which comprises no part of the present invention, but is shown to more clearly illustrate the entire unit. The balance potentiometer 56 is connected in a bridge circuit, not shown, and functions upon movement of the shaft 33 and sheave 14 to balance out the deviation signals so that when the sheave reaches a desired correcting position the bridge is balanced and the operating motor 13 is deenergized.

Positioned closely adjacent the combination clutch and brake member 20 is a failsafe unit generally indicated by the reference numeral 60. The failsafe unit 60 is disposed to be operated upon deenergization of the winding of clutch 30, or automatically upon power failure to the servo unit, to disengage the braking surface of the disk 25 from the surface of the stationary friction member to permit manual control operation of the sheave 14. The failsafe unit includes an electromagnet 61 having a plunger 62 operably connected to a rocker arm 63. The rocker arm 63 is pivoted upon and is supported by a standard 64. Positioned near the electromagnet 61 and operably engaging the rocker arm 63 closely adjacent one end thereof is a relatively strong biasing spring 65. The biasing spring 65 opposes the action of the electromagnet 61 and thereby urges the rocker arm 63 and the plunger 62 toward deenergized position. The opposite end of the rocker arm 63 is provided with a socket 66 which is arranged upon deenergization of the electromagnet 61 and expansion of the biasing spring 65 to move the shaft 24 axially thereby compressing biasing springs 28 and disengaging the plate 25 from the stationary friction member 26 and into engagement with disk 17.

The improved servo unit of this invention is preferably connected to a source of electric power so that the reversible motor 13 and the actuating winding 23 of the clutch and brake unit 20 are energized substantially concurrently as is best shown in Fig. 7. The wiring system also provides that the winding 34 of clutch 30 and the electromagnet 61 are energized and deenergized substantially concurrently. If through malfunction, the clutching surfaces of clutch 30 should fail to separate upon normal deenergization of the coil 34, the failsafe unit 60 through the deenergization of the solenoid 61 and the operation of spring 65 will operate to release the brake plate 25 of the clutch and brake unit 20 from the stationary friction member 26 and will move it into engagement with disc 17 of the clutch so that the sheave 14 may be manually operated or rotated through any suitable means (not shown) in the associated system.

Operation of the improved servo unit of this invention is substantially as follows: when the craft upon which the servo unit is mounted is at rest, the entire unit is deenergized. The biasing spring 65 of the failsafe unit 60 is expanded, the rocker arm 63 thus being at the limit of its counterclockwise travel has caused axial movement of shaft 24 thereby compressing biasing springs 28 so that the brake surface of disk 25 is disengaged from the stationary friction member 26. The armature 40, under the contracting action of biasing springs 53, is now spaced from the kerfed surface of the cup-shaped member 31. Consequently, the grooved sheave 14 and the shaft 33 may be rotated freely. Upon energization of the system, the plunger 62 of the failsafe unit 60 is moved to energized position thereby compressing biasing spring 65 and permitting the biasing springs 28 to move shaft 24 axially. This movement of the shaft 24 causes the disk 25 to engage friction member 26 to lock the gear train 12 against operable movement. The winding 34 of the output shaft clutch 30 is also energized whereupon the movement of armature 40 to energized position causes the teeth 42 of the armature 40 to move into meshed engagement with the teeth of the cup-shaped member 31. This movement of the armature 40 extends the biasing springs 53 which urge the armature 40 to disengaged position. The sheave 14 and all parts operably connected through the reduction gear train 12 to the disk 25 are now locked against operable movement.

Assume now that there is a call for automatic control operation, the reversible motor is energized and starts rotation in a desired direction, the winding 23 being substantially concurrently energized attracts the armature 27 thereby compressing biasing springs 28 and moving shaft 24 axially so that the braking engagement between the disk 25 and friction member 26 is broken and operable engagement is established between disk 25 and disk 17, whereupon the sheave 14 is driven in the desired direction. Upon movement of the control member to the desired position the balancing potentiometer causes the motor 13 and winding 23 to be deenergized, whereupon the biasing springs 28 function to set the brake by shifting the shaft 24 so as to cause disk 25 to engage friction member 26. With the brake set, the mechanism is secured against movement. Now assume that it is desirable or necessary to operate the controls manually. The winding 34 of the output clutch 30 is deenergized whereupon the biasing springs 53 normally function to roll the annular member 44 axially upon the ball members 48 of the antifriction driving connection so as to disengage the teeth 42 of the armature 40 from the teeth of the cup-shaped member 31; after this movement the sheave 14 may be freely rotated. But assume now that the biasing springs 53 are unable to move the annular member 44 axially to free the armature 40 from the cup-shaped member 31. Under ordinary conditions the transition from automatic control to manual control would be prevented. However, in the present device such is not the case. Concurrently with the deenergization of the clutch 30 the failsafe unit 60 is also deenergized and the brake is released. Accordingly, the sheave 14 may be manually operated regardless of the position of armature 40. However, in the event the output shaft clutch 30 fails to release upon deenergization of its electromagnet, the rotation of the sheave also rotates the gear train and the rotor of the motor 13.

There is thus provided a safety feature in the form of an antifriction driving connection for the axial moving portion of a clutch to minimize or eliminate the possibility of malfunction due to sticking or freezing. And in addition there is herein provided a safety feature for promptly and effectively overcoming the effective result of such malfunction if it should occur. Furthermore the safety features incorporated herein function in the event of power failure to release the mechanism so it may be operated manually.

It will be apparent from the foregoing that herein is provided an efficient and sturdy servo unit in which means are incorporated for greatly reducing or totally eliminating some of the serious hazards of previous automatic-manual control systems. While in the preferred embodiment of the improved device it is contemplated the dual releases be operable concurrently, it will be apparent that they may be operated independently of each other where such operation is so desired.

It will also be apparent to those skilled in the art to which the improved device appertains that numerous changes in design and construction may be made from the embodiment here illustrated and disclosed without departing from the spirit and scope of the invention. Accordingly, it is intended that the disclosed embodiment of the invention be interpreted as illustrative only and that the scope of the invention be limited only as determined by the appended claims.

I claim as my invention:

1. A servo unit, comprising, in combination, a member operable between two extreme positions, said member being adapted to be selectively operated by manual or mechanical means, said mechanical operating means including a reversible electric motor connected to said member by a gear train, an electromagnetically operated combination clutch and brake means forming a part of said connection, said motor and said combination means being electrically connected so that upon energization of said motor said combination means moves into clutch engaging position and upon deenergization of said motor said combination means moves into brake engaging position, electromagnetically operated clutch means forming a part of the connection between said motor and said member, said clutch means being selectively operable to disengage said member from operable association with said mechanical means, and electromagnetically operated means biased to deenergized position and operable concurrently with said clutch means to move said brake means from an engaged to a disengaged position.

2. A servo unit, comprising, in combination, a driven member, electrically actuated driving means operably connected to said driven member, combination brake and clutch means operably associated with said driving means and said driven member for controlling the operable movement of said driven member, means for moving said combination means into clutch engaging position upon energization of said electrically actuated means whereupon said driven member is operated, means operable to move said combination means into brake engaging position upon deenergization of said electrically actuated driving means whereupon said driven member is secured against rotation, clutch means interposed between said driven member and said combination means, means for operating said clutch means to disconnect said driven member from said combination means, and two position means operable concurrently with said clutch means, said means in one position releasing said combination means from brake engaging position.

3. In a device of the kind described, a driven member, motor means for driving said driven member, means drivingly connecting said motor means and said driven member, said connecting means including means operable to drivingly connect said motor means and said driven member when said motor means is drivingly operated and operable to prevent operable movement of said driven member when said motor means is at rest, disconnect means forming a part of said connecting means and operable to release said driven member from said connecting means, and failsafe means including an electromagnet and a spring in opposed operative relationship being operable upon power failure to said motor means to move said connecting means from a movement prevention to a drivingly connected relationship with said motor means.

4. A servo unit, comprising, in combination, a driven member, motor means operably connected to said driven member, brake means positioned intermediate said motor means and said driven member, means biasing said brake means to engaged position, disconnect means interposed between said brake means and said driven member, said disconnect means including a driving member rotationally and axially movable relative to said driven member, a second biasing means urging said disconnect means toward disengaged position, means selectively operable to move said disconnect means into engaged position, and means including a third biasing means selectively operable for releasing said brake means.

5. A servo unit, comprising, in combination, a driven member, motor means operably connected to said driven member, brake means positioned intermediate said motor means and said driven member, means biasing said brake means to engaged position, clutch means interposed between said motor means and said driven member, said clutch means including a driving member rotationally and axially movable relative to said driven member, antifriction means operable to facilitate axial movement of said driving member and to provide a positive driving connection between said driving member and said driven member, a second biasing means urging said clutch means toward disengaged position, means selectively operable to move said clutch into engaged position, and means including a third biasing means for overcoming said first named biasing means to move said brake means from said engaged position.

6. In a device of the kind described, a driven member, motor means for driving said driven member, means drivingly connecting said motor means and said driven member, said connecting means including means operable to drivingly connect said motor means and said driven member when said motor means is drivingly operated and operable to prevent operable movement of said driven member when said motor means is at rest, disconnect means forming a part of said connecting means and selectively operable to release said driven member from said connecting means, and means including an electromagnet and a biasing means in opposed relationship selectively operable to release said connection means from movement preventing position.

7. A servo unit comprising in combination, a driven member, electrically actuated driving means operably connected to said driven member, combination brake and clutch means operably associated with said driving means and said driven member for controlling the operable movement of said driven member, means for moving said combination means into clutch engaging position upon energization of said electrically actuated means whereupon said driven member is operated, means operable to move said combination means into brake engaging position upon deenergization of said electrically actuated driving means whereupon said driven member is secured against rotation, disconnect means interposed between said driven member and said combination means, means for operating said disconnect means to terminate the braking connections with said combination means, and failsafe means include a biasing member operable upon power failure to overcome said means operable to move said combination means into brake engaging position.

8. A servo unit, comprising in combination, a member operable between two extreme positions, said member being adapted to be selectively operated by manual or mechanical positioning means, said mechanical positioning means including motor means operable to drive said member to any position along its extent of travel and means to maintain said member in any position along its extent of travel, disconnect means selectively operable to release said member from said mechanical positioning means, and electromagnetic failsafe means including a biasing member operative upon deenergization of said failsafe means to release said maintaining means from said maintained position.

9. A servo unit, comprising in combination, a member operable between two extreme positions, said member being adapted to be selectively operated by manual or mechanical positioning means, said mechanical positioning means including means operable to drive said member to and maintain it in any position within its extent of travel, electromagnetic disconnect means selectively operable to release said member from said mechanical positioning means, and failsafe means including a biasing means selectively operable to release said mechanical positioning means from said maintained position.

10. A servo unit, comprising in combination, a driven member, motor means operably connected to said driven member, combination brake and clutch means positioned intermediate said motor means and said member, means biasing said combination means to brake engaging position, electromagnetic means for overcoming said biasing means and moving said combination means to clutch engaging position, disconnect clutch means interposed between said combination means and said driven member, said clutch means including a driving member rotationally and axially movable relative to said driven member, and antifriction means operable to facilitate axial movement of said driving member and to provide a positive driving connection between said driving member and said driven member.

11. A servo unit comprising in combination, a driven member, electrically actuated driving means operably connected to said driven member, combination brake and clutch means operably associated with said driving means and said driven member for controlling the operable movement of said driven member, means for moving said combination means into clutch engaging position upon energization of said electrically actuated means whereupon said driven member is operated, means operable to move said combination means into brake engaging position upon deenergization of said electrically actuated driving means whereupon said driven member is secured against rotation, disconnect means interposed between said driven member and said combination means, means for operating said disconnect means to terminate the braking connections with said combination means, and torque limiting means forming a part of said connection between said driving means and said driven member, said torque limiting means being positioned between said disconnect means and said combination means.

12. A servo unit comprising in combination, a driven member, electrically actuated driving means operably connected to said driven member, combination brake and clutch means operably associated with said driving means and said driven member for controlling the operable movement of said driven member, means for moving said combination means into clutch engaging position operable concurrently with an energization of said electrically actuated means whereupon said driven member is operated, means operable to move said combination means into brake engaging position upon deenergization of said electrically actuated driving means whereupon said driven member is secured against rotation, electromagnetically actuated disconnect means interposed between said driven member and said combination means, said disconnect means including a toothed portion connected to said combination means and a toothed portion connected to said driven member, electromagnetic means for moving said toothed portions into driving relationship to connect said member to said combination means, and biasing means for moving said toothed portions out of driving relationship to disconnect said driven member from said combination means.

13. A servo unit comprising in combination, a driven member, electrically actuated driving means operably connected to said driven member, combination brake and clutch means operably associated with said driving means and said driven member for controlling the operable movement of said driven member, means for moving said combination means into clutch engaging position operable concurrently with an energization of said electrically actuated means whereupon said driven member is operated, means operable to move said combination means into brake engaging position upon deenergization of said electrically actuated driving means whereupon said driven member is secured against rotation, electromagnetically actuated disconnect means interposed between said driven member and said combination means, said disconnect means including a toothed portion connected to said combination means and a toothed portion connected to said driven member, electromagnetic means for moving said toothed portions into driving relationship to connect said member to said combination means, biasing means for moving said toothed portions out of driving relationship to disconnect said driven member from said combination means, and means for controlling the energization of said electrically actuated driving means driven by said toothed portion of said disconnect means connected to said driven member.

14. A servo unit, comprising in combination, a member operable between two extreme positions, said member being adapted to be selectively operated by manual or mechanical means, said mechanical means including a reversible electric motor and an electromagnetically operated combination clutch and brake means, said motor and said combination means being electrically connected so that upon energization of said motor said combination means moves into clutch engaging position and upon deenergization of said motor said combination means moves into brake engaging position, electromagnetically operated disconnect means forming a part of said combination between said motor and said driven member, said disconnect means being selectively operable to disengage said driven member from said operable association with said mechanical means, and electromagnetic means including a spring selectively operable to move said combination means from brake engaging to clutch engaging position.

15. In a device of the class described, a member operable between two extreme positions, said member being adapted to be selectively operated by manual or mechanical means, said mechanical means including motor means and a clutch and brake means operable to drive said member to and maintain it in any position within its extent of travel, disconnect means selectively operable to release said member from said mechanical means, and failsafe means including an electromagnetic means and biasing means operable to release said mechanical operating means from said maintaining position.

WILLIAM L. HUNTINGTON.

REFERENCES CITED

The following references are of record in the file of this patent:

UNITED STATES PATENTS

| Number | Name | Date |
|---|---|---|
| 1,472,257 | Titterington | Oct. 30, 1923 |
| 1,989,984 | Hope | Feb. 5, 1935 |
| 2,151,338 | Shonnard | Mar. 21, 1939 |
| 2,164,633 | Barrett | July 4, 1939 |
| 2,280,222 | Dos | Apr. 21, 1942 |
| 2,315,110 | Dornier | Mar. 30, 1943 |
| 2,354,854 | Doll | Aug. 1, 1944 |
| 2,373,736 | Arnot | Apr. 17, 1945 |
| 2,403,094 | Lear | July 2, 1946 |
| 2,403,101 | Lear | July 2, 1946 |
| 2,426,505 | Hill | Aug. 26, 1947 |
| 2,445,658 | Bishofberger | July 20, 1948 |
| 2,451,109 | Nardone | Oct. 12, 1948 |
| 2,480,212 | Baines | Aug. 30, 1949 |